United States Patent [19]

Bakhoum

[11] Patent Number: 5,267,311
[45] Date of Patent: Nov. 30, 1993

[54] INTELLIGENT DISKETTE FOR SOFTWARE PROTECTION

[76] Inventor: Ezzat G. Bakhoum, P.O. Box 2818, Durham, N.C. 27715-2818

[21] Appl. No.: 986,667

[22] Filed: Dec. 8, 1992

[51] Int. Cl.$^5$ .......................... H04L 9/00; G11B 15/04
[52] U.S. Cl. ............................................ 380/4; 360/60
[58] Field of Search .......................... 380/3, 4; 360/60

[56] References Cited

U.S. PATENT DOCUMENTS

| | | |
|---|---|---|
| 4,446,519 | 5/1984 | Thomas . |
| 4,734,796 | 3/1988 | Grynberg et al. . |
| 4,785,361 | 11/1988 | Brotby .................................. 360/60 |
| 4,858,036 | 8/1989 | Ginkel . |
| 4,959,861 | 9/1990 | Howlette . |
| 4,980,782 | 12/1990 | Ginkel . |
| 5,122,912 | 6/1992 | Kanota et al. . |

OTHER PUBLICATIONS

Pagemaker, Aldus; Ref. Manual; Dec. 1987; p. 2-18; Aldus Corp., Seattle, WA.

Pagemaker, Aldus; User Manual; Dec. 1987; p. 1-26; Aldus Corp., Seattle, WA.

Primary Examiner—Stephen C. Buczinski

[57] ABSTRACT

A device for protection of computer software installed on hard disks against unauthorized copying and use, and particularly a device of such type that is embedded inside an ordinary diskette cartridge.

The device depends mainly in its operation on a VLSI microcontroller embedded inside the diskette and interfaced to a read/write head placed in contact with the surface of the floppy disk. In connection with such device, a method is described to prevent an executable code from being installed on more than one machine, even if several machines are present in the same workplace.

The device of the invention is very convenient for the software user. Together with the convenience, it successfully achieves two main objectives: first, preventing the software from getting transferred and used overseas, and secondly, preventing the software from getting transferred to a friend or colleague in the same workplace.

36 Claims, 6 Drawing Sheets

INTELLIGENT DISKETTE FOR SOFTWARE PROTECTION

BACKGROUND OF THE INVENTION

1. Field of the Invention

This invention relates to a device for protection of computer software installed on hard disks against unauthorized copying and use, and particularly a device of such type that is embedded inside a diskette cartridge.

2. Important Notice to the Reader of this Patent Application

This patent application describes a device of a relatively simple physical structure. However, the mechanism by which the device performs its function is new and of considerable complexity.

Every effort has been made to keep the specification clear and understandable. However, patience and concentration in reading are necessary for understanding.

The section titled "Software protection in the same workplace" is the most important section of this application and should be read with special care.

3. Description of the Related Art

Each year, billions of dollars worth of American software is stolen overseas. This not only hurts the American software developers, but is also extremely damaging to the U.S. economy, one of its key elements of strength being technology.

In one country half-the-way around the globe, I saw a software merchant advertising: "We sell the latest version of AutoCad for 15 pounds".

Software theft has become a widely spread phenomenon in recent years due to the extreme ease with which data can be transferred among magnetic media, and the lack of successful means for preventing unauthorized data transfers.

It is the object of the present invention to provide such successful device for preventing software theft. The device is an intelligent diskette that accompanies each set of executable diskettes. Without the presence of that device, execution of the code on the CPU is impossible.

In the prior art, several techniques have been developed in attempts to prevent software theft, none of which has been completely successful to date. The first attempt was to alter the standard format of storing files on the magnetic media to prevent unauthorized duplication. But rapidly programs were developed to break this copy-protection scheme. Another attempt was to provide an intelligent circuit that connects to the computer via a serial port or internal bus. Unfortunately, however, such circuits can easily be duplicated by professionals, as they usually depend on a ROM which can be duplicated by various means. Further, the use of an additional piece of hardware for each software program is very inconvenient for the user.

A third technique is described in U.S. Pat. No. 4,734,796 issued Mar. 29, 1988 to Grynberg et al, which shows a method for preventing unauthorized copying of diskettes based on inducing surface defects at known locations on the magnetic media. A still further technique is shown in U.S. Pat. Nos. 4,858,036 and 4,980,782 issued Aug. 15, 1989 and Dec. 25, 1990, respectively, to Peter Ginkel, which depends on the use of magnetic materials possessing high coercivity to prevent duplication of diskettes.

Unfortunately, however, the techniques of those three patents are still vulnerable to unauthorized copying by professionals. Further, once the executable code is installed on a hard disk (as is usually the case), such protection methods are worthless.

It is the objective of the present invention to provide a device for preventing the use of stolen software. Since "copy-protection" techniques have failed to prevent software theft, the present invention rather prevents the execution of the code on the CPU, unless the device of the invention is present in the floppy disk drive of the computer.

It is another objective of the present invention to provide a method for software protection which is extremely convenient for the end user, by featuring an ordinary diskette cartridge that can be easily loaded in the disk drive of the computer each time the software is run.

It is finally the ultimate objective of the present invention to provide a method and device for software protection which will prevent an executable code from being installed on more than one machine, even if several machines are present in the same workplace.

Other aspects and features of the invention will be more fully apparent from the ensuing disclosure and appended claims.

SUMMARY OF THE INVENTION

In a broad aspect, the present invention relates to a device for preventing unauthorized use of software, comprising:
- a diskette cartridge comprising a housing and a rotatable magnetic media placed inside the housing;
- a microcontroller embedded inside the housing of said diskette;
- at least one magnetic head interfaced to said microcontroller, and placed in contact with the surface of the magnetic media.

Whereby handshaking is accomplished by means of exchanging signals between the embedded microcontroller and the host computer, via the magnetic media of the diskette.

DETAILED DESCRIPTION OF THE INVENTION, AND PREFERRED EMBODIMENTS THEREOF

Basic Structure and Handshaking Techniques

Figure 1A:
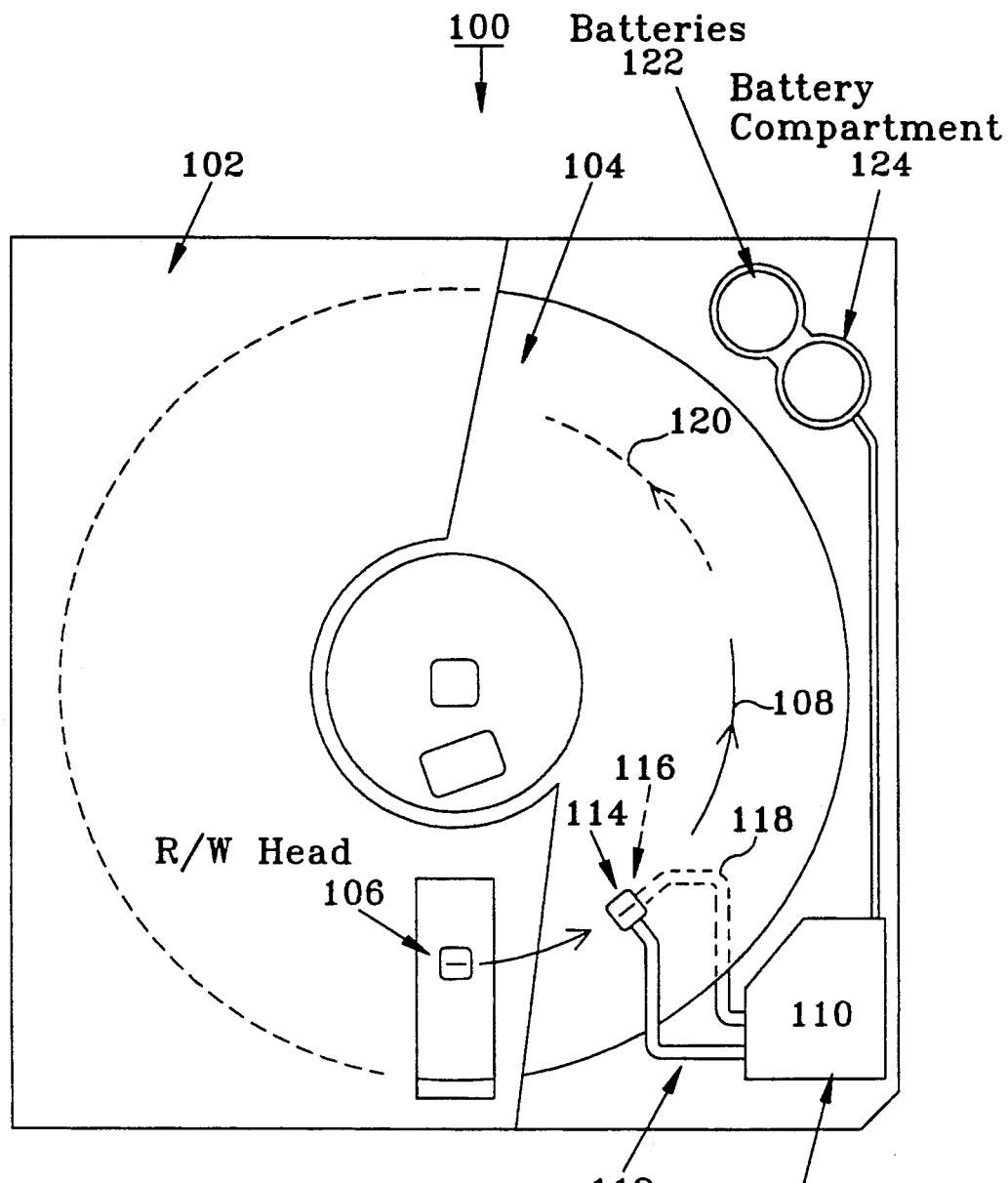
FIG. 1(a,b) is a schematic representation of an intelligent diskette according to the present invention, comprising a microcontroller and two magnetic heads.

The present invention mainly features an intelligent device that works in conjunction with an ordinary floppy disk. An executable code, supplied by a software vendor, will check for the presence of such device inside the floppy disk drive of the computer, and should not execute if the device is not present.

In conjunction with such intelligent diskette, a method will be further described which will enable the executable code to "recognize" the host computer it was first installed on. This will prevent the code from unlawfully getting installed on several machines in the same workplace, with the intelligent diskette being used to activate all such machines simultaneously.

The handshaking between the host computer and the intelligent diskette will be accomplished by means of polling. As a preferred embodiment of the present invention, the executable code running on the host writes a special stream of bits on the magnetic media of the diskette. The microcontroller inside the diskette, in response to such stream, issues a password, which is written on the same track of the floppy disk, to be later read by the host computer and passed to the executable code as a certification of the presence of the diskette in the drive.

Clearly, such password must be different each time the intelligent diskette is "polled"; for if the password is constant, it would be a simple matter to professionals to pick up the password by various means, including direct reading from the diskette, and later program the same password on a different intelligent diskette supplied by the same manufacturer. Therefore, the intelligent diskette of the present invention must provide a sequence of passwords, such sequence being known only to the executable code with which the diskette is intended to work.

(My own experience as a professional Engineer has taught me that a severe mistake is to assume that a given new technology is sophisticated enough so that it is unvulnerable to copying by professional technology pirates. I have seen such individuals in several countries around the world. Any technology which can be duplicated or stolen by some means will be duplicated and stolen. My objective in the present invention is to provide a protection method which by no means can be duplicated).

In accordance with the present invention, a technique for the generation of a sequence of passwords will be described. Such technique will require the "programming" of few bytes of data, to be stored in internal registers inside the microcontroller used in conjunction with the diskette. Such programing is normally done by the software vendor, and has the advantage of storing critical data on RAM, rather than ROM; as it is widely known that ROMs can be accessed in virtually any system or device, and the contents of the ROM can be obtained by various means. It is true that a ROM can be built into the microcontroller at the time of fabrication of the chip, without exposing the data bus for external access; however, the programing must be done by the manufacturer in this case. The advantage of using RAM is to allow one or more manufacturers to produce intelligent diskettes in mass quantities and supply such diskettes to software vendors, with only a control program, but no data, being stored on the diskettes. Each software vendor will then be able to program his intelligent diskettes without the risk of letting the manufacturer have access to critical data.

Reference is now made to FIG. 1(a) in the drawings. FIG. 1(a) shows an ordinary diskette cartridge 100 which may be a 3.5" or 5.25" type diskette. The jacket or housing of the diskette, 102, preferably made of hard plastic, is shown with a broken section on the right-hand side, thereby exposing the internal detail to view. The floppy disk 104 is shown as rotating counterclockwise in the figure, with the read/write head of the host computer 106 being positioned over one particular track 108 (the movable head 106 of the host computer is not a part of the diskette and is shown in FIG. 1(a) only for clarity). Inside the housing, special provisions are made to embed a custom-made CMOS microcontroller 110.

Figure 1B:
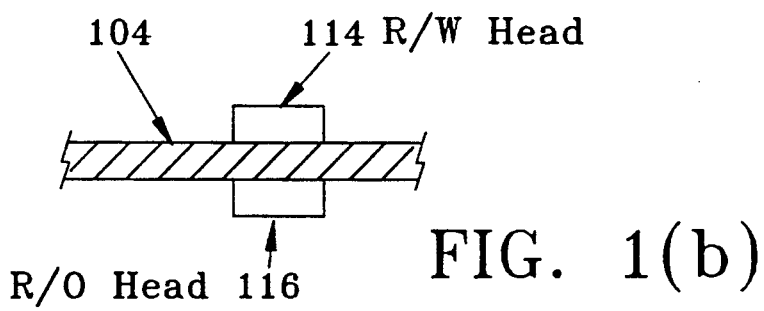

The microcontroller 110 is connected to a thin ribbon connector 112, carrying interface signals to a fixed read/write head 114. The head 114 is positioned over the particularly-chosen track 108, and is in contact with the surface of the floppy disk. The function of head 114 is to read and write handshaking information. The microcontroller is similarly connected with a connector 118 to a fixed read-only head 116 positioned on the other side of the floppy disk, such that the disk is sandwitched between the two heads, as shown in FIG. 1(b). The function of the read-only head 116 is to read synchronization pulses from a track 120 on the lower surface of the disk. The synchronization track 120 (the function of which will be more emphasized later) serves as a "clocking" means for the microcontroller. The heads 114 and 116 are preferably embedded within the layers of cushioning material that usually surround the floppy disk.

It will be therefore apparent that one particular cylinder in the diskette will be designated to hold two types of information, on two different tracks: a data track 108, and a synchronization track 120.

The microcontroller is finally connected to a set of thin Lithium batteries 122, such batteries being installed inside a cavity 124 in the housing. The cavity 124 is accessible from the outside for the purpose of replacing the batteries. (The intelligent diskette should be supplied to the software vendor with no batteries installed. The batteries should be installed by the software vendor prior to the programing of the handshaking code).

Normally, a microcontroller, which is in most instances a special-purpose microprocessor, comes equipped with a PC (program counter), an internal bus, a microcode, etc.; in order to allow the fetching and execution of instructions from a ROM. Such elements, however, are not required in the microcontroller 110 of the present invention. Instead, all control functions of the microcontroller 110 will be implemented by a special logic and control circuit, which demands much less space on a VLSI chip. Such circuit, in fact, will mimic a "control program" directly on silicon, without the requirement for formal architecture. The structure of the proposed microcontroller will be explained in some detail later.

Now, with the basic structure of the device being understood, we shall turn our attention to the main problem of the present invention, that is, how the intelligent diskette should generate the sequence of passwords, and how the executable code should be able to recognize such sequence?

First of all, in order to facilitate the "commercial" handshaking between the manufacturer of intelligent diskettes and the large number of software vendors, it is preferable that the diskette be supplied with a standard control program, as mentioned previously (in our case, such control program will be a "hard-wired" program). This will enable each software vendor to program his own handshaking method, by writing to the diskette an ordinary file containing such information, while the control program handles the transfer of data from the magnetic media of the diskette to the internal registers of the microcontroller (this procedure will be explained later in further detail). Without the presence of such control program, the software vendor cannot simply "write" the handshaking information to the diskette as a file. In fact, the microcontroller must be supplied with a standard architecture (i.e., with a program-counter, internal bus, etc.), and the software vendor has the extra burden of doing low-level programing. Such low-level programing may not be done optimally; and most importantly, cannot be done unless the internal bus of the microcontroller is exposed to public use; which may not protect the critical data inside the registers, once the registers are programmed. We therefore see that the existence of a standard control program not only saves space on the VLSI chip, but also prevents lots of trouble.

With the control program being known, how a handshaking method between the intelligent diskette and the host computer should be defined to the microcontroller?, and how a sequence of passwords should be generated? Clearly, the control program itself must handle the generation of such sequence, which must be different for each user. The first idea is to use a different "mask" for each user, which may consist of several bytes, and which can be used as a "seed" or basis for generating a sequence. However, an important problem arises in such case: how the executable code can keep track of the "order" in such sequence? i.e., how to prevent the executable code from getting "fooled" by passing to the code an old password in the sequence? One possible solution, which will prove to be unsuccessful, is to maintain a "counter" as a file on the hard disk, or else to maintain the sequence itself as a long list in a file (which may be coded by some means) and update that file each time the code is run to "mark" the most recently used password. Unfortunately, such scheme will not be successful because a clever user can simply pick-up a password, together with the password file (or counter file) that matches this password, and write that file to the hard disk each time before the software is run. We can amuse ourselves by thinking of other alternatives for solving this problem; but since this may take several pages of government paper and several hours of precious reader time, I shall rather state directly that such problem is unsolvable. This will become clear if we simply observe that a microcontroller equipped with batteries has means to maintain a "memory". Such memory is not available for an executable code, except on the magnetic media of a disk.

The handshaking problem will truly be solved by using a "two-way" handshaking protocol, rather than sequence generation. In a two-way handshaking protocol, the executable code sends a "test" password to the intelligent diskette. The diskette, in turn, "decodes" the test password and issues a "confirmation" password to indicate its presence. Clearly, the decoding method must be known to the executable code in order to verify that the decoding was done correctly. The decoding method must be programmed by the software vendor and stored in the microcontroller's registers prior to the distribution of software.

Figure 2:
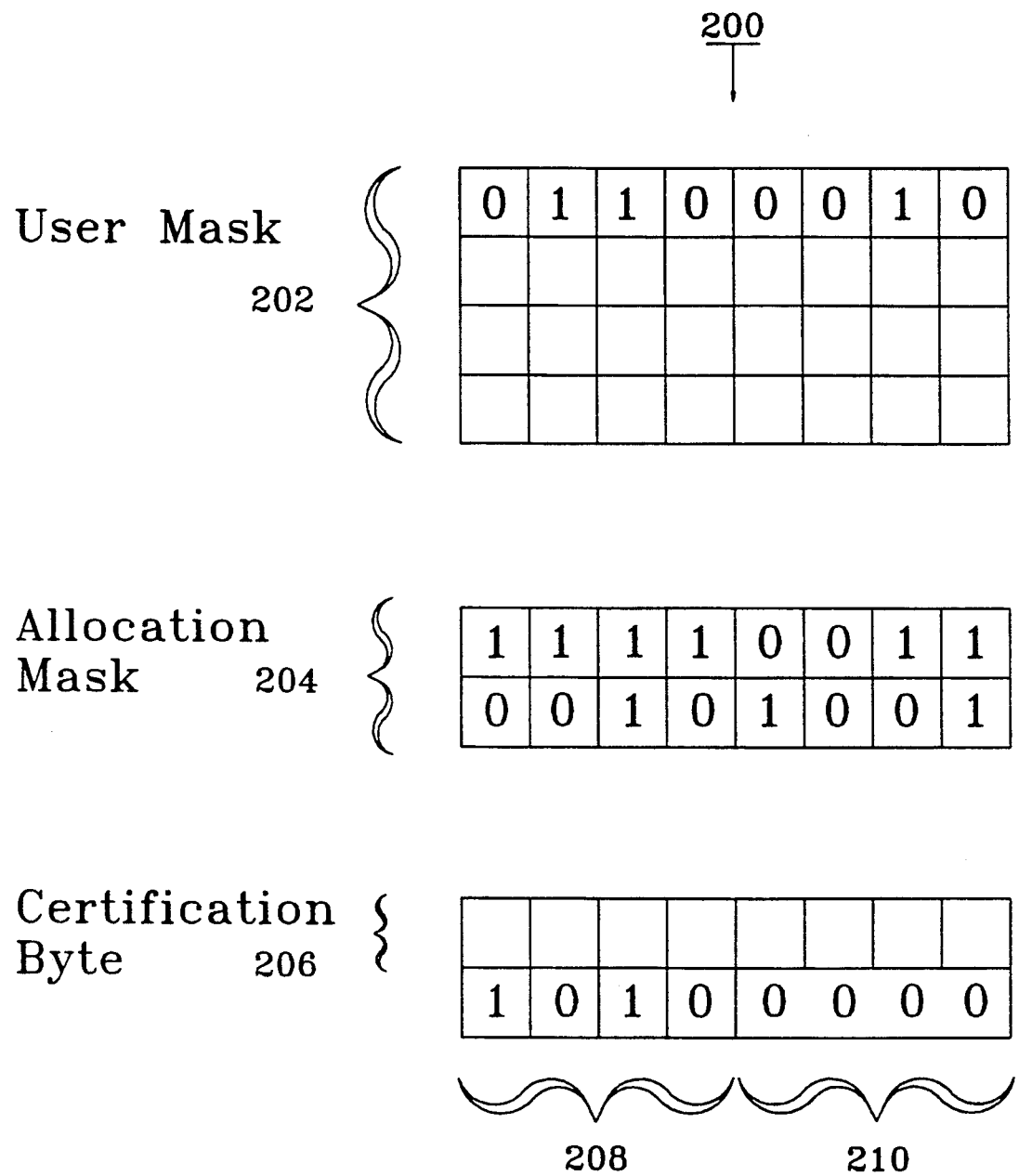
FIG. 2 shows an 8-byte user mask to be programmed and stored inside the microcontroller of the diskette.

I shall now explain the preferred embodiment of the present invention. Referring to FIG. 2, a set of registers 200, consisting preferably of 8 registers, are used to store two different types of masks: a "User mask" 202, consisting of 4 bytes, and an "Allocation mask" 204, consisting of 2 bytes. The remaining 2 bytes are used for a special purpose which will be explained later. An incoming test password, consisting of 4 bytes, will go through a bitwise INVERT operation, which is determined by the user mask (in the example shown in FIG. 2, the second, third, and seventh bits in the first byte of the test password will be inverted, while the remaining bits in that byte will be left unchanged). A test password may equally be NORed or NANDed with the mask; however such operations are not recommended, since a test password consisting of all 0's or all 1's can sometimes fool a logic system based on these operations. In any case, the operation must be fixed and defined by the diskette manufacturer. Such preliminary operation has the purpose of hiding or "masking" the sequence of bits in the test password. Now, since any logic operation, if known, can be reversed, further masking is necessary. The preferred embodiment is to further hide the resulting 4 bytes among several bytes of irrelevant data. Since the data in the resulting 4 bytes will be unknown after the masking, it will be impossible to distinguish such data from irrelevant data in a long sequence of bytes (this is similar to card game, where several playing cards are being displayed, with the locations of the significant cards being known only to one player). Such is the function of the allocation mask 204. Each half-byte in the allocation mask indicates how each corresponding byte in the masked password should be allocated within a stream of 16 bytes. In the example of FIG. 2, the first byte of data should occupy the 16th position in a stream of 16 bytes, the second byte of data should occupy the 4th position, the third byte of data should occupy the third place in the stream, and the last byte should occupy the 10th position.

Figure 3:
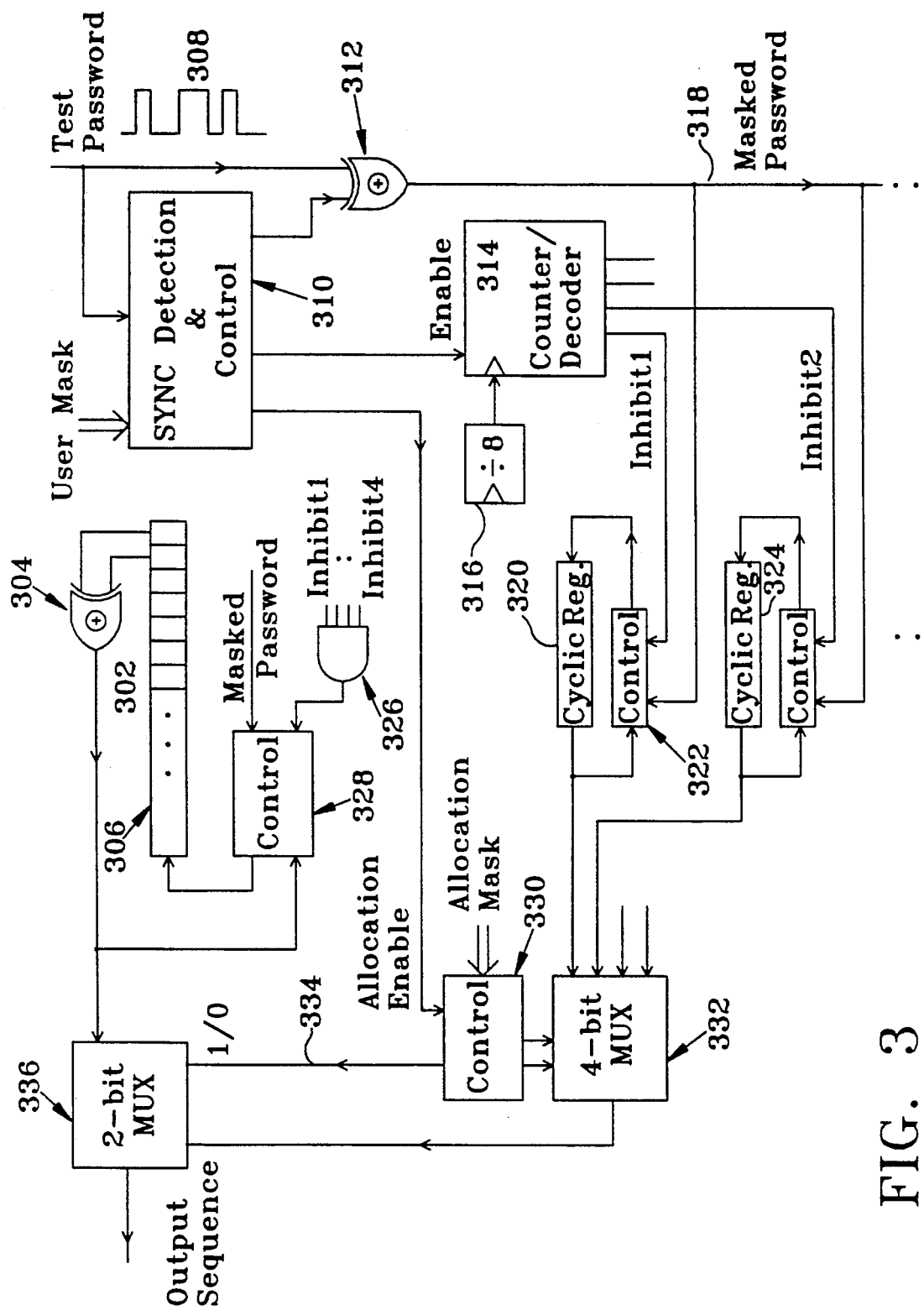
FIG. 3 is a block diagram illustrating the main principle of operation of the microcontroller of the present invention.

As a result, the executable code running on the host computer issues a test password of 4 bytes and receives a stream of 16 bytes, only 4 bytes of which are meaningful. The number of possible allocations in such masking scheme is given by 16!/12!, or a number in the order of 43,000. An important question now is: how the irrelevant data should be generated? Clearly, we cannot simply use a random bit generator on the chip; for if a random bit generator is used, a simple trick would be to pass the same test password to the intelligent diskette twice, and simply observe the 4 bytes in the resulting sequence which will remain unchanged. Therefore, a "pseudo-random" bit generator must be used. Such pseudo-random bit generator must be driven by the test password itself, so that a repeated test password will result in the same 16-byte pattern. However, another pitfall must be avoided here: clearly, the 16-byte pattern must not be completely predictable; for if such pattern is completely predictable for a given test password, we have not solved our problem. How this can be done? The solution can be seen in FIG. 3. FIG. 3 shows a pseudo-random bit generator 302 comprising an XOR gate 304 and a feedback shift register 306 (this pseudo-random bit generator is a well known circuit, and is described more fully in *Principles of CMOS VLSI design*, by Weste and Eshraghian, Addison Wesley, 1985, page 266). For generating a pseudo-random sequence of 16 bytes, a 7-bit shift register is required. Now, how to select such 7 bits for initializing the shift register? Since the test password itself must drive the pseudo-random generator, we can simply route a portion of the masked password to shift register 306 in order to start the 16-byte sequence (it is essential to use a portion of the "masked" password, not the original password, to avoid generating a predictable sequence). But before we go any further, we will have to mention a serious drawback of the pseudo-random bit generator 302: it is true that only 7 bits are required to obtain a 16-byte sequence, however such circuit can only generate 128 distinct sequences. This can be seen from the fact that a 7-bit shift register can only have 128 different initial states. The problem now is clear: 128 is a very small number. The 128 different sequences could be even written on a single sheet of paper and compared visually to the output sequence. For that purpose, it is preferable to make the shift register 306 4-bytes long, and route the entire masked password to the shift register (this task will be explained in more detail later). An initial state of 4 bytes will result in $2^{32}$, or some 4000 million distinct sequences. But, have we solved our problem? definitely not. It is true that such large number of sequences cannot be written on a sheet of paper, however, a computer simulation can be done to compare "on the fly" all possible sequences to one particular sequence captured from the diskette, and hence determine the initial state, i.e., the masked password. What, then, is the definite measure of security in such a system? The definite measure of security is the 4 bytes of the unmodified masked password, which will be "mixed", or allocated in unknown places within the output sequence, thereby making the sequence itself undistinguishable (we recall, again, the idea of the playing cards). If space on the VLSI chip permits, a mask of more than 4 bytes can be used for added security.

It should be noted that, for proper protection, the user mask must not be "sparse" in nature; for if a user mask like, for example, 00...01 is used, we have simplified the job for a technology pirate (this can be seen if a test password of all 0's or all 1's is used with such a mask. In this case, the resulting sequence will be near the very beginning or the very end of the list. A famous example in everyday's life is the combination lock. We never set the combination of such locks to be 000 or 999). This is usually not a problem if the software vendor has to select 4 different bytes for each user, or $2^{32}$ combinations in total, since any software vendor is not likely to have such huge number of customers.

Figure 4:
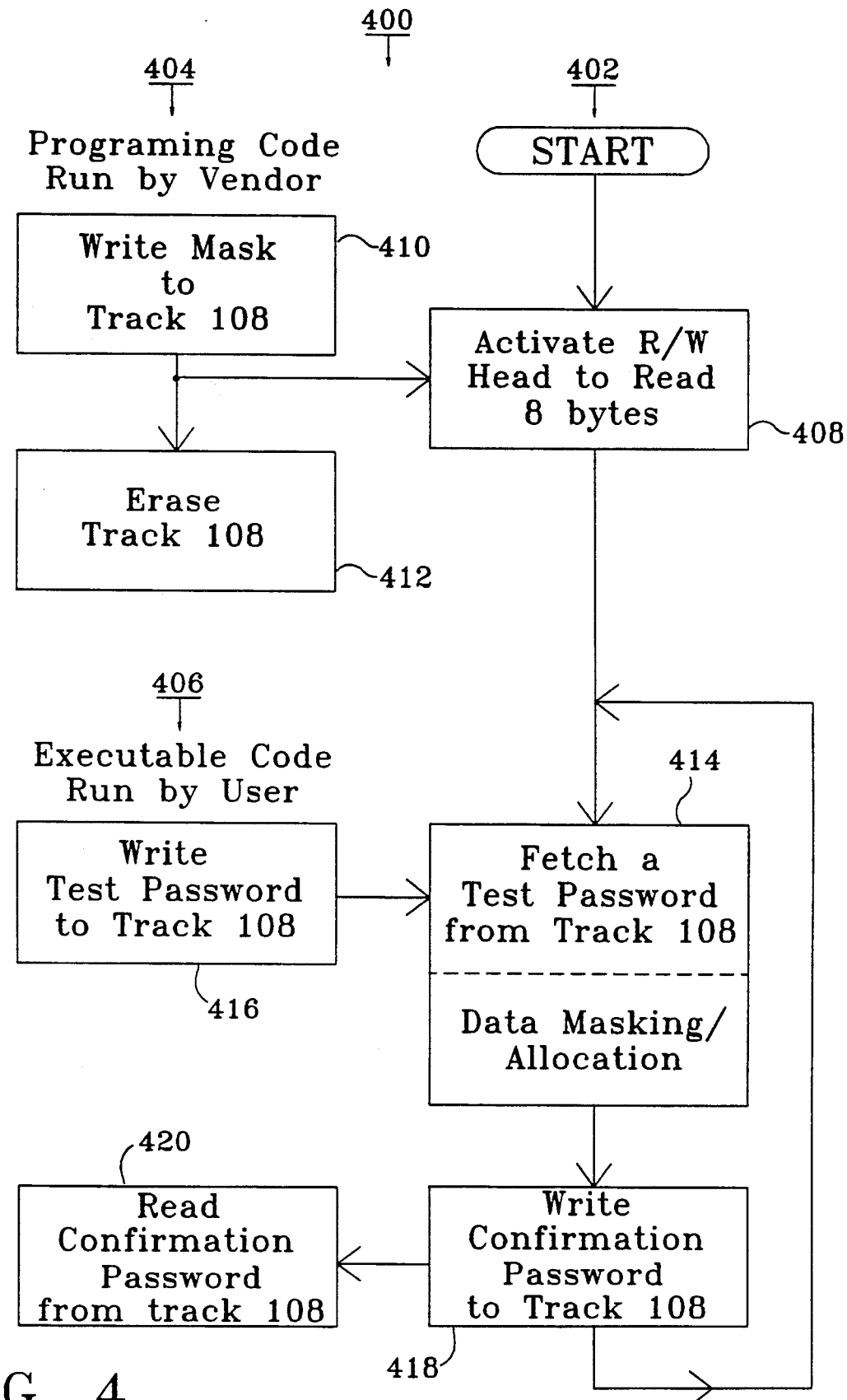
FIG. 4 is a flow chart illustrating the preferred handshaking method between the intelligent diskette and the host computer, according to the present invention.

Referring now to FIGS. 1,3,4 and 5, the functionality of the intelligent diskette will be explained in detail:

FIG. 4 shows a flowchart 400 of the control program 402 which will be "hard-wired" in the microcontroller's circuitry. In FIG. 4, the control program is interacting, first, with the programming code 404 that should be run by the software vendor in order to transfer the 8 user bytes to the micro-controller inside the diskette, and then interacting with the testing code 406 (a part of the user-executable code). When the diskette is supplied to the software vendor, the vendor installs the batteries inside the diskette, and the microcontroller starts executing the control program 402. Since the microcontroller is actually clocked by external means (the synchronization track 120), execution of the control code actually starts when the disk starts rotating.

The first step 408 in the control program activates the read/write head 114 in order to read the sequence of 8 bytes. Such sequence of is first written in a serial fashion by the host's read/write head 106, and then captured by the fixed head 114 inside the diskette. Clearly, such write-read procedure requires a special synchronization technique in order to enable the head 114 to recognize the data. Such technique will now be explained.

Figure 5:
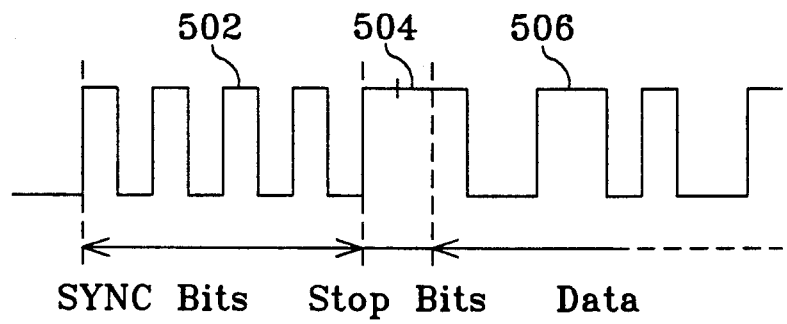
FIG. 5 shows a synchronization method for data transfer, according to one embodiment of the invention.

First, the programming code 404 running on the computer reads the DIR (Directory) and FAT (File Allocation Table) on the floppy disk. Based on prior information recorded in the DIR and FAT areas, and supplied by the manufacturer, the magnetic head 106 of the computer is directed to track 108, and seeks the first sector in that track. The programming code then starts to write the sequence of 8 bytes as an ordinary file. Such file will contain synchronization information beside the mask information. FIG. 5 shows a write-read synchronization method as a preferred embodiment. As shown in FIG. 5, the host's magnetic head first writes a long sequence of Sync bits 502, consisting of alternating High's and Low's, as shown. The microcontroller inside the diskette, now being clocked by the lower synchronization track 120, detects the Sync bits on upper track 108, and prepares to capture the 8-byte data. The Sync bits terminate with a sequence of two Stop bits 504, and then the data 506 starts. Clearly, the read/write head 114 must be interfaced to a set of 8 shift registers for storing the mask information.

Now, with the 8-byte data being transferred to the microcontroller, the primary objective of the programming code has been accomplished (step 410). The programming code must now erase track 108 (step 412) by writing some irrelevant information to that track (clearly, the data should not remain on the disk). The control code then proceeds to the next phase (user phase) and attempts to fetch a test password from the disk (step 414) when the disk starts rotating. As shown in FIG. 4, the executable code 406 writes Sync pulses to track 108, followed by a test password (step 416). By the same write-read mechanism explained previously, the fixed head 114 inside the diskette fetches the test password, and the Data Masking is done on the fly in step 414 (this procedure will be explained in detail later). The microcontroller then writes the 16-byte confirmation sequence to track 108 (step 418). Later, the executable code reads and analyses the confirmation sequence (step 420). A point of interest is in order here: the microcontroller inside the diskette must not be allowed to write over the header of sector 2 on track 108; i.e., if the processing delay is large, the microcontroller may require more than 4096 clock pulses to accomplish its mission. That number, $(4096 = 512 \times 8)$ is the number of bits in sector 1, which is composed of 512 bytes. As sector 1 rotates past the magnetic head in the diskette, the microcontroller receives 4096 clock pulses. However, writing over the header of sector 2 is very unlikely to occur because the microcontroller reads some Sync pulses, followed by a 4-byte sequence and then writes Sync pulses, followed by a 16-byte sequence; which, in total, is far less than 512 bytes. Nevertheless, such provisions must be taken in the design in order to allow the executable code to read the confirmation sequence as a part of an ordinary file.

Referring now to FIG. 3, I shall explain the basic idea behind the proposed Masking/Allocation technique.

Rather than laying down a complex logic circuit, the idea will be explained in "block diagram" form. An incoming test password 308 is fed serially to a circuit 310 for detecting Sync pulses and for performing control functions upon such detection. When the two stop bits are detected at the end of the Sync pulse sequence, the circuit 310 starts routing the user mask bits, serially, to an XOR gate 312, where the incoming bits of the test password are properly inverted (the reader can verify that an XOR gate will indeed perform an INVERT operation, determined by a mask, where both the mask bit and the data bit are given as inputs to such gate). At the same instant, an Enable signal is issued to a counter/decoder unit 314, having four active-low outputs, labeled Inhibit1–Inhibit4. The counter/decoder unit 314 is clocked by a "divide-by-eight" circuit 316, by means of which the Inhibit outputs are activated sequentially, one every eight clock pulses. As a result, when the Enable signal is received, Inhibit1 becomes active for a duration of 8 clock pulses, during which the first byte of the masked password 318 is transferred to a cyclic shift register 320, of which a total of 4 registers exist. The cyclic register 320 is equipped with a control unit 322, and similarly all other cyclic registers. The control unit 322 has the purpose of detecting an active Inhibit signal and inhibiting the cyclic register from operating in a cyclic mode. When Inhibit1 becomes active, for instance, the register 320 does not operate in a cyclic mode, but instead the first byte of data is transferred to the register. During the following period of 8 clock pulses, Inhibit2 becomes active, while all the others are inactive. As a result, the control unit 322 opens the feedback path, and register 320 operates in a cyclic mode; while the next cyclic register, 324, accepts the second byte of the masked password; etc. When the counter determines that 4 bytes have been received, the control unit 310 removes the Enable signal, and the Inhibit outputs are latched high (disabled). (Both logic units 310 and 314 may be operated from a single counter. Such detail is not shown in FIG. 3).

As a result of the foregoing, each of the four bytes of the masked password become trapped in a cyclic register, and starts rotating inside the register, once the Inhibit signal is disabled (needless to say, all such shift registers must be clocked). Meanwhile, the masked password is also transferred, as a sequence of 4 bytes, to the pseudo-random bit generator 302, discussed previously. This task is simply implemented by means of a four-input AND gate 326, which gives an active signal if any of the four Inhibit inputs is active. A control unit 328, upon receiving the active signal, disables the feedback to shift register 306 and routes the masked password instead.

When the counter reaches the 4-byte count, the control unit 310 disables the decoder unit 314, as explained previously, and further issues a signal to a special unit (not shown in FIG. 3), to start writing a burst of Sync pulses, in preparation for issuance of the confirmation sequence. After the Sync burst is written, the control unit 310 issues an Allocation Enable command to a control unit 330 that reads the two Allocation Mask bytes and correspondingly activate a 4-bit multiplexer 332, such multiplexer being fed from the four cyclic shift registers, starting with register 320. The control unit 330 must be linked to the counter. After the Sync burst is written, the counter is reset, and the count then proceeds from OH to FH. At each count, the control unit 330 compares the value of the counter to the value of each of the four half-bytes in the Allocation Mask. If the two values match, one of the trapped bytes in the four cyclic shift registers will be routed to the output, by means of a proper selection signal issued to multiplexer 332. The control unit 330 features a special output line 334 which may carry a signal of either 0 or 1. If one of the trapped bytes in the cyclic registers is being selected, the signal on line 334 is 1 and the output of multiplexer 332 appears at the output of multiplexer 336. If, however, none of the trapped bytes is selected, the signal 334 is 0 and the output of the pseudo-random bit generator is selected by the output multiplexer.

We will finally have to mention a deficiency of the XOR gate 304 used in the pseudo-random bit generator. It can be observed that, if a particular test password and its complement are used, the two resulting sequences will be identical, due to the nature of the XOR gate. However, the four hidden bytes of the masked test password will not be identical in the two sequences. In fact, such four bytes will be complemented in the second sequence, which will allow easy identification of those bytes. To avoid this trap, a different logic function, such as a NAND, can be used instead of the XOR gate 304. However, the logic function does not necessarily have to be simple. In fact, such logic function can be arbitrarily complicated, and may involve one or more bits of the shift register 306. Further, such logic function must in practice be kept secret by the diskette manufacturer.

What are the extra burdens on the software vendor in view of such complexity? Nothing. The software vendor merely has to prepare 8 different bytes of data for each user, which will be first incorporated into the executable code and then loaded into the intelligent diskette (the function of the last two bytes of data has not been yet explained). The intelligent diskette will then be distributed with the software. The executable code does not necessarily have to be modified in order to incorporate the 8-byte mask, and perform the other functions, such as writing and reading to/from the intelligent diskette. All such functions can be built into a standard subroutine and given by the diskette manufacturer. A single call to such subroutine is then all what it takes to get this valuable software protection!

Software protection in the same workplace

Now, with the handshaking problem between the intelligent diskette and the host computer being solved, we shall turn our attention to the most important problem of the present invention: how to prevent unauthorized use of software in the same office or workplace, if an attempt is made to install the software package on more than one machine, and them use the intelligent diskette supplied with the package to activate all such machines? A simple, very efficient technique will now be presented, which will enable the executable code to "recognize" the host computer it was first installed on.

The idea depends on the use of a software file which is not supplied with the code, but is rather created when the code is first run or installed. This file, which I shall call the "Sector Verification File", or SVF, for short, has the only purpose of holding the sector number of the hard disk on which it is actually recorded. For example, if the SVF is recorded on sector number 3906, then the contents of that file should actually read "3906". However, that file must never be written in plain ASCII; instead, the information "3906" must be coded in a manner that is known only to the software vendor, i.e., a manner that only the executable code can read, to prevent easy identification of the file by inspection. Now, why is this coding necessary, despite the fact that the location of the SVF can actually be found from the directory of the hard disk? The answer is that the SVF must in reality be mixed with several other support files which are created when the executable code is first run or installed, and which are irrelevant to the protection of the software. Only the executable code "knows" the name of the SVF file. As a result, no one should be able, by simply inspecting the bundle of support files created by the code, to recognize which file is actually the SVF file.

It will be nearly impossible for someone who has just installed the software on a new platform, and who is know attempting to copy the support files from the original platform, knowing that the SVF file is among those files, to get all support files recorded at exactly the same locations as in the original hard disk (since the operating system mainly handles such file allocation), unless extremely formidable and time-consuming low-level system management tasks are taken to rearrange all such files at exactly the same locations, together with the pain of moving other information on the hard disk around to make space for the new files.

As an added measure of security, the executable code should really create several SVF files (not just one, since one SVF may hit in the right place by chance); all to be checked when the code is re-run.

But how the executable code can recognize, each time the code is run, that installation has been performed in the past, in order to start looking for the SVF file, instead of attempting to create a new one? This is the function of the last two bytes of the 8-byte mask stored inside the intelligent diskette. FIG. 2 shows a "certification" byte 206 followed by a half-byte 208 describing the location of that certification byte in the 16-byte sequence. In the example of FIG. 2, the certification byte should occupy the 11$^{th}$ position in the sequence. Needless to say, the half-byte 208 must be different from each of the four half-bytes in the Allocation Mask. The remaining half-byte 210 must always be set to 0H when the 8-byte mask is transferred to the diskette. The function of the half-byte 210 will now be explained. When the diskette is called for the first time, the contents of the half-byte 210 are checked and verified to be 0H. The certification byte then appears at the particularly chosen location within the sequence, to certify that no installation has been attempted in the past. After the first call, the half-byte 210 is set to FH. At subsequent calls, the diskette checks the contents of half-byte 210, and the certification byte is not issued if at least one bit is set to 1. It will be apparent, then, that the half-byte 210 is in reality a 4-bit "flag" that is used to verify prior-installation. It is desirable to have such 4-bit flag, as it is common in VLSI systems that one or more bits in a register may suddenly lose their contents due to a stray field, or other numerous influences.

Figure 6:
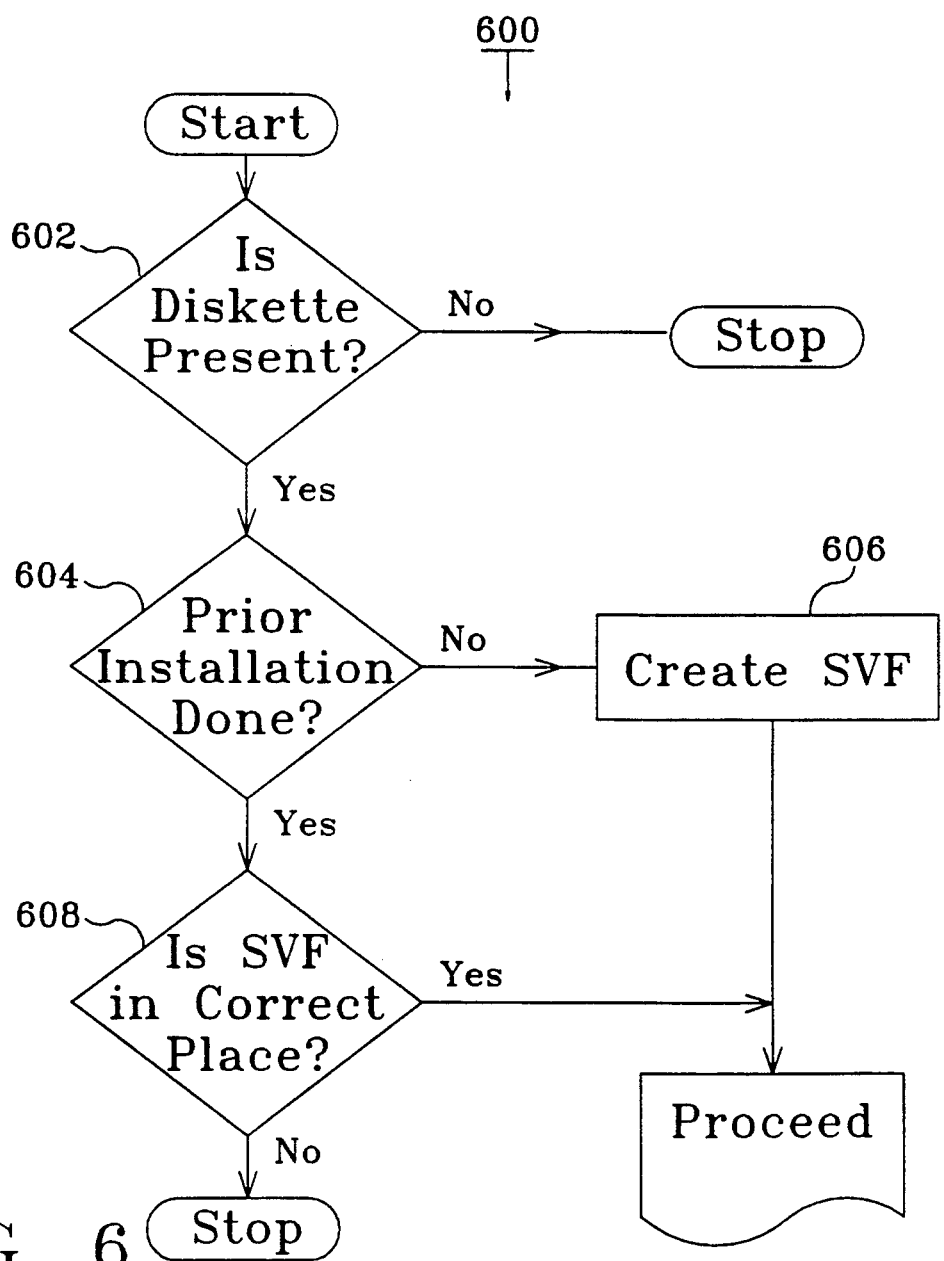
FIG. 6 is a flow chart illustrating steps to be taken by an executable code, for protection against unauthorized use by different users in the same workplace.

Now, how such functions can be implemented? In fact, the idea requires minor modifications to the basic scheme of FIG. 3. First, the half-byte 208 must be read by the control unit 330, together with the basic Allocation Mask. When the turn comes for the certification byte to appear in the sequence, the multiplexer 332 selects the certification byte if the flag 210 is set to 0H (in fact, multiplexer 332 must be a 5-bit multiplexer). Otherwise, the certification byte undergoes a logic operation with the pseudo-random sequence, and is then routed to the output (it is necessary not to route the pseudo-random sequence itself to the output in order to avoid the possibility of obtaining the certification byte by pure chance). A suitable logic operation for that purpose would be a simple NAND operation. If the intelligent diskette shows that installation has been performed (i.e., the certification byte does not appear at its expected location), the code should not create the bundle of support files, but instead should attempt to read the SVF file from the bundle already existing on the hard disk. FIG. 6 shows a flowchart 600 that describes the steps taken by the executable code each time the intelligent diskette is called. As shown, step 602 checks for the existence of the diskette in the floppy disk drive of the computer. Step 604 then checks for the existence of the certification byte in its expected location. If the certification byte appears in the output, the system proceeds to create the SVF file and the other support files (step 606). If, however, the certification byte does not appear, the system then verifies that the contents of the SVF file match its physical location on the hard disk (step 608). If not, the system concludes that the software has been illegally copied from its original platform.

It will be apparent, then, that the function of the SVF is to work in conjunction with the intelligent diskette in the same workplace; with the intelligent diskette providing hardware means to verify if installation of the code has been performed in the past (in this context, installation means that the code has been run at least once), and with the SVF file providing means to verify that re-installation (or re-running) is being performed on the same computer. But can't the means for checking prior-installation be done by software, thereby eliminating the need for expensive hardware? Unfortunately, the answer is no. At the bottom line, any set of diskettes supplied by a software vendor can be copied and installed on several machines, no matter what the contents of these diskettes are. Hardware is the only thing that can't be transferred among magnetic media!

The SVF idea depends mainly in its operation on the wide physical differences among hard disks, such as size, speed, coding methods, etc. Fortunately, the lack of standardization turned out to be the benefit of software protection!

An important question now arises: if the only purpose of the intelligent diskette is to verify prior-installation, why is all the hassle of the previous section necessary? that is, why transfer masks to the diskette, generate a pseudo-random sequence, etc.; and further, why build a complex VLSI chip after all? Can't we simply let an "intelligent human" install the software? i.e., let a representative of the software firm perform the installation for each user, so that the user cannot have the software on diskettes.

That question is a very fair question, and I will now answer it in some detail. It is true that such approaches can be taken; i.e., the intelligent diskette can truly be eliminated, and the SVF file can be solely responsible for software protection. However, I shall emphasize that the function of the intelligent diskette is not merely to verify prior-installation. The true function of such device is to save the software vendor from getting into severe trouble. Let us explain: if we assume that no such device is present, i.e., no masking or handshaking is being performed; what if a user claims that his/her hard disk has crashed, or has been accidentally formatted, or that a catastrophic accident has happened to the computer? Normally, the software vendor must re-installed the software for the user on a new machine. This will not only take time and effort, but further, the software vendor may, in reality, be unknowingly helping to install the code on a different machine for free. In other words, without the presence of such intelligent hardware device, we have not solved much of our problem.

Let us now see how the presence of such nice device will let the software vendor rest in piece: if the user needs re-installation for any reason (including battery failure of the intelligent diskette), the user merely has to mail his intelligent diskette back to the vendor. In a five minute process, the vendor will now transfer a new 8-byte user mask to the diskette (thereby rendering the previously-installed code inactive), and then supply the re-programmed intelligent diskette to the user, together with a new set of software diskettes. The old, or previously-installed copy of the code should not be able to recognize the new mask, and will therefore remain inactive. In fact, re-programming the intelligent diskette is a matter of "renewing the license agreement" with the user!

In order to avoid any further pitfalls, the intelligent diskette must be marked with the name of the software firm and the serial number of the user (clearly, the software vendor cannot recognize one of his own intelligent diskettes unless it is properly marked). More on this idea will be given shortly.

It is important that the SVF file be a read-only or hidden file, to prevent accidental erasure by the user (all the bundle of support files should be marked the same in order to successfully camouflage the SVF files). A further technique to enhance the elusive character of an SVF file is to make the file longer than 2K bytes (by inserting some irrelevant data. Note that 2K is the cluster size on most hard disks), and then storing in the file the entire FAT entry for that file. By this technique, if the copied SVF file hits in the right starting sector accidentally, it may not necessarily have the same FAT entry as the original file.

The foregoing describes only some possibilities afforded by the SVF idea. In general, I feel that the idea is powerful, and several other alternatives and modifications are possible within its broad scope. For example, the SVF may be used to describe the physical location of an arbitrary data file (or a group of files), not necessarily its own physical location. In such case, it is not even necessary to "hide" the SVF among other support files. The SVF can be clearly named "SVF", and the size of the file may be much longer than 2K. Its contents may very well read: "The FAT entry of file A is . . . ; The FAT entry of file B is . . . ; etc." In this manner, if the code and its support files are installed directly from the release diskettes onto a new hard disk, the user knows that the SVF file cannot be simply "copied" from the original hard disk. It is mandatory that the contents of the SVF must always be coded in a manner that is known only to the software vendor.

Figure 7:
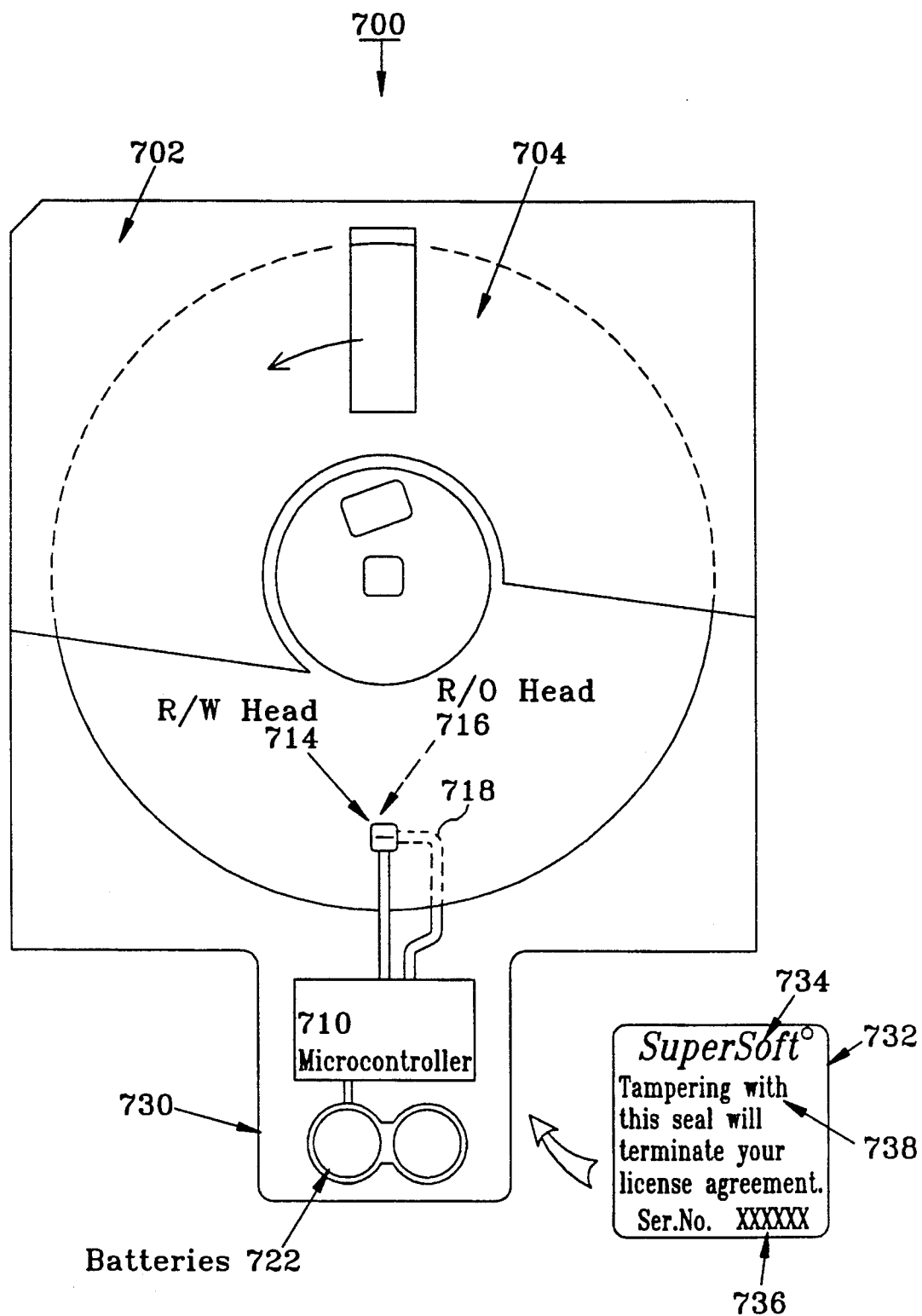
FIG. 7 is a schematic representation of an intelligent diskette, according to a different embodiment of the present invention.

FIG. 7 shows a modified version of the intelligent diskette, 700, with the modification being essentially the addition of an extension 730 to the basic jacket 702. This extension may be added if the size of the VLSI chip 710, together with the set of batteries 722, is large, so that such elements cannot be fitted into the frame of the main jacket 702. Now, back to the problem of properly marking the intelligent diskette, we see a sticker 732 bearing the name of the software firm 734, the serial number of the user 736, and a special warning statement 738. The sticker 732 must preferably be fixed on the top of the battery compartment with a strong adhesive. The function of sticker 732 will now be explained. As mentioned previously, a clever user may attempt to keep his intelligent diskette active, and send a "fake" or blank diskette to the software vendor, asking for a duplicate copy of the code. The presence of sticker 732 will prevent such action. If the sticker is secured to the diskette with a strong adhesive, it will be impossible to remove the sticker without destroying it. The sticker 732 must preferably be placed on the top of the battery compartment of the diskette, to further prevent any accidental or "innocent" tampering with the batteries, since any such tampering will result in the stored data being lost.

Other alternatives and enhancements to this basic idea are possible. For example, one possible alternative would be to place a certain code number for each user inside the battery compartment; such code number to be checked when the diskette returns back to the vendor (of course, such code number must be different from the serial number of the user). If the user attempts to remove the batteries in order to access his secret code number, his intelligent diskette will become inactive anyway. A still further alternative is to use a metallic sticker 732, with the back of the sticker being placed in contact with the batteries 722, thereby closing the electric circuit of the device. Of course, any tampering with the sticker will result in power loss and render the diskette inactive.

While the devices of FIGS. 1 and 7 have been illustratively described hereinabove with reference to specific configurations, it will be recognized that the invention may be variously configured. One potentially important alternative to the basic structure of the intelligent diskette will now be discussed in some detail. Referring to FIG. 1, it can be seen that the rotating magnetic disk 104 can be entirely eliminated, and the embedded head 114 can be placed within the rectangular window of the jacket, to come in direct contact with the movable head 106 of the computer, when the head 106 reaches track 108. In this case, the handshaking signals will not be transmitted via the magnetic media of the disk, but rather directly between the two heads. Such an alternative, while feasible, is not attractive from the Engineering stand point, as it will introduce considerable complexities into the system. For instance, such alternative will require that the microcontroller "emulates" a Directory and FAT areas; such areas being present normally on a magnetic disk. Further, the microcontroller must emulate a "sector header", in addition to the other information, when the computer attempts to "read" from track 108. Finally, the most important difficulty is this: how synchronization between the embedded microcontroller and the host computer can be achieved? It is true that a crystal can be used for clocking the microcontroller, with a frequency that is adjusted according to the particular speed on track 108; however, perfect synchronization for the write-read operation will require complex circuitry on the VLSI chip. The presence of a synchronization track 120 in the original design simplifies things dramatically. In view of such complexity, the approach of eliminating the magnetic media from the diskette cartridge is not generally recommended. Nevertheless, such alternative can be taken without departure from the scope of the invention.

Further, while the invention has been shown in a particular embodiment as an intelligent device embedded inside a diskette cartridge, it will be appreciated that the device may be embedded inside a tape cartridge, without departure from the scope of the invention.

Moreover, the preferred software techniques used in conjunction with the intelligent device, such as the described Masking/Allocation method for handshaking, and the Sector Verification File (SVF) for software protection, do not necessarily have to be used in conjunction with an intelligent "diskette". In fact, such techniques can be used with virtually any hardware device that may be connected to the host computer via a serial port, a parallel port, or a data bus; without departure from the scope of the invention.

Finally, while the invention has been described with reference to specific aspects, features, and embodiments, it will be appreciated that various modifications, alternatives, and other embodiments are possible within the broad scope of the invention, and the invention therefore is intended to encompass all such modifications, alternatives, and other embodiments, within its scope.

What is claimed is:

1. A handshaking method between two digital systems, consisting of:
   a test signal, issued by first system;
   a confirmation signal, issued by second system;
   wherein the confirmation signal comprises a masked form of the test signal, mixed with other irrelevant data, such that the locations of the masked signal within said irrelevant data are known to the first system.

2. A method according to claim 1, wherein the first system is a computer.

3. A method according to claim 1, wherein the second system is a hardware device for data protection.

4. A method according to claim 1, wherein the second system generates irrelevant data by means of a pseudo-random bit generator.

5. A method according to claim 4, wherein the pseudo-random bit generator is driven by the masked test signal.

6. A method according to claim 1, wherein the second system comprises cyclic shift registers and control circuitry for allocation of the masked test signal.

7. A method according to claim 3, wherein the hardware device is embedded inside a diskette cartridge.

8. A method according to claim 3, wherein the hardware device is embedded inside a tape cartridge.

9. A method according to claim 3, wherein the hardware device is connected to a serial port in the computer.

10. A method according to claim 3, wherein the hardware device is connected to a parallel port in the computer.

11. A method according to claim 3, wherein the hardware device is connected to the data bus of the computer.

12. A method for preventing unauthorized use of software by means of detecting the movement of data files, consisting of:
    a verification file, wherein the contents of the verification file describe the original sector location of at least one data file on a hard disk, and wherein such contents are coded in a manner that is unknown to the user in order to prevent tampering with the verification file;
    an executable file for reading the contents of said verification file, and for comparing such contents with the physical sector location of the at least one data file;
    means within said executable file for disabling access to the software in case said original and physical sector locations do not match.

13. A method according to claim 12, wherein the verification file is the at least one data file.

14. A method according to claim 12, wherein the verification file is different from the at least one data file.

15. A method according to claim 12, wherein the executable file is the at least one data file.

16. A method according to claim 12, wherein the executable file is different from the at least one data file.

17. A method according to claim 12, wherein the contents of the verification file describe the physical locations of multiple data files.

18. A method according to claim 12, wherein the name of the verification file is known only to the executable file.

19. A method according to claim 12, wherein the verification file is created when the executable file is run for the first time.

20. A method according to claim 12, wherein the size of the verification file is at least one byte.

21. A method according to claim 12, wherein the size of the verification file is at least 2K bytes.

22. A method according to claim 12, wherein the contents of the verification file describe the starting sector number of the at least one data file.

23. A method according to claim 12, wherein the contents of the verification file describe the entire FAT entry of the at least one data file.

24. A method according to claim 12, wherein the verification file is a read-only file.

25. A method according to claim 12, wherein the verification file is a hidden file.

26. A method according to claim 12, wherein the verification file is mixed with a bundle of irrelevant files.

27. A method according to claim 12, comprising multiple verification files.

28. A method according to claim 12, used in conjunction with a hardware device for verifying prior-installation of the software.

29. A method according to claim 28, wherein the hardware device is embedded inside a diskette cartridge.

30. A method according to claim 28, wherein the hardware device is embedded inside a tape cartridge.

31. A method according to claim 28, wherein the hardware device is connected to a serial port in the computer.

32. A method according to claim 28, wherein the hardware device is connected to a parallel port in the computer.

33. A method according to claim 28, wherein the hardware device is connected to the data bus of the computer.

34. A device according to claim 28, comprising a secret code placed inside a battery compartment for verifying the identity of the device.

35. A device according to claim 28, comprising a label for displaying a name of a software firm and for warning against tampering with the device.

36. A device according to claim 35, wherein the label is metallic for connecting a power source to the device and for disconnecting the power source when the device is tampered with. r

* * * * *